C. S. Williamson,
Harvester Cutter.

No. 63350.  Patented Mar. 26, 1867.

Witnesses:

Inventor:
C. S. Williamson
per Munn & Co
Attorneys

United States Patent Office.

C. S. WILLIAMSON, OF COVERT, NEW YORK.

Letters Patent No. 63,350, dated March 26, 1867.

---

IMPROVED METHOD OF SECURING CUTTERS TO SICKLE-BARS.

---

The Schedule referred to in these Letters Patent and making part of the same.

---

TO ALL WHOM IT MAY CONCERN:

Be it known that I, C. S. WILLIAMSON, of Covert, in the county of Seneca, and State of New York, have invented a new and improved Mode of Securing Teeth to the Sickle-Bars of Harvesters; and I do hereby declare that the following is a full, clear, and exact description thereof, which will enable those skilled in the art to make and use the same, reference being had to the accompanying drawings, forming part of this specification, in which—

Figure 1:
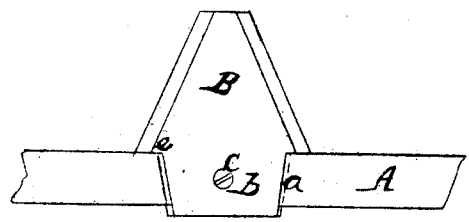
Figure 3:
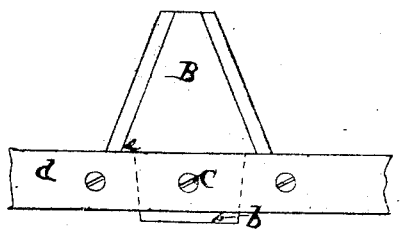

Figures 1 and 3 represent plan or top views of a sickle or cutter-bar with a cutter or tooth attached according to my invention.

Figure 2:
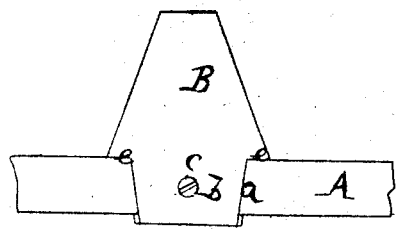

Figure 2, an inverted plan of a sickle or cutter-bar with a cutter or tooth attached.

Figure 4:
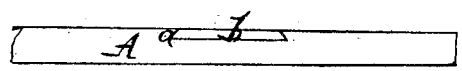
Figure 5:
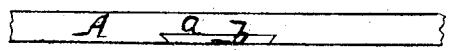
Figure 6:
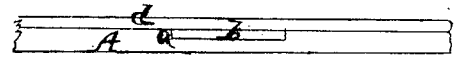

Figures 4, 5, and 6, rear views of figs. 1, 2, and 3.

Similar letters of reference indicate corresponding parts.

This invention has for its object the attaching of teeth to the sickle-bars of grain and grass harvesters in such a manner that they may be readily detached when necessary for the purpose of being ground or to have new ones applied, and also readily attached to the sickle-bar.

A, figs. 1 and 4, represents a sickle or cutter-bar constructed of the usual dimensions, and having a groove, $a$, made in its upper surface with oblique sides, so that said groove will be wider at its front than at its rear end. The sides of this groove are inclined so as to form a dove-tail, as shown clearly in fig. 4. B is a cutter or tooth, constructed with a shank or tang, $b$, of taper form corresponding to the shape of the groove, and the sides of the shank or tang $b$ are inclined to correspond to the inclination of the sides of the groove $a$, so that the shank or tang $b$ may be fitted in $a$ and prevented from rising or moving vertically out therefrom, as will be understood by referring to fig. 4. The shank is prevented from moving longitudinally out from the groove $a$, by a screw, $c$, which passes vertically through the shank or tang $b$ into the cutter or sickle-bar A. In figs. 2 and 5 the same mode of attachment is shown, with the exception that the groove $a$ is made in the under side of the sickle or cutter-bar A, the cutter or tooth B being secured to the under side of the bar. In figs. 3 and 6 the tang $a$ of the cutter or tooth is covered by metal bar $i$, the latter being secured by screws to the top or upper surface of A. The shank or tang $b$, at its junction with the rear of the cutter or tooth, is of less width than the latter so as to leave a shoulder, $e$, at each side to abut against the front edge of the sickle or cutter-bar.

Having thus described my invention, what I claim as new, and desire to secure by Letters Patent, is—

The cutter B, having shoulders $e$, resting against the sickle-bar A, with tapering shank $c$, fitting in groove $a$ of the sickle-bar, forming a dove-tail joint, in the manner described for the purpose specified.

C. S. WILLIAMSON.

Witnesses:
  A. MURPHY,
  GEO. W. MURPHY.